United States Patent
Neier et al.

(10) Patent No.: US 9,377,301 B2
(45) Date of Patent: Jun. 28, 2016

(54) MOBILE FIELD CONTROLLER FOR MEASUREMENT AND REMOTE CONTROL

(71) Applicant: Hexagon Technology Center GmbH, Heerbrugg (CH)

(72) Inventors: Gunnar Neier, Dornbirn (AT); Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/175,825

(22) Filed: Feb. 7, 2014

(65) Prior Publication Data

US 2014/0247439 A1 Sep. 4, 2014

(30) Foreign Application Priority Data

Feb. 8, 2013 (EP) .................................... 13154696

(51) Int. Cl.
*G01C 3/06* (2006.01)
*G01C 15/00* (2006.01)
*G01S 17/02* (2006.01)
*G01S 17/42* (2006.01)
*G01S 17/87* (2006.01)
*G01S 3/782* (2006.01)
*G01S 7/00* (2006.01)
*G01S 17/66* (2006.01)

(52) U.S. Cl.
CPC ............... *G01C 3/06* (2013.01); *G01C 15/002* (2013.01); *G01S 3/782* (2013.01); *G01S 7/003* (2013.01); *G01S 17/023* (2013.01); *G01S 17/42* (2013.01); *G01S 17/87* (2013.01); *G01S 17/66* (2013.01)

(58) Field of Classification Search
CPC ........ G01C 15/002; G01C 15/00; G01S 1/00; G01B 11/26
USPC ................................................. 356/3.01–5.15
See application file for complete search history.

(56) References Cited

U.S. PATENT DOCUMENTS

| 5,903,235 | A | 5/1999 | Nichols |
| 6,381,006 | B1 | 4/2002 | Ramström |

(Continued)

FOREIGN PATENT DOCUMENTS

| EP | 1 686 350 A1 | 8/2006 |
| EP | 2 431 708 A1 | 3/2012 |

(Continued)

OTHER PUBLICATIONS

European Search Report dated Jul. 3, 2013 as received in Application No. EP 13 15 4696.

*Primary Examiner* — Luke Ratcliffe
(74) *Attorney, Agent, or Firm* — Maschoff Brennan

(57) ABSTRACT

A mobile field controller, together with a geodetic surveying device, forms a one-person measurement system for geodetic position determination. The field controller allows the spatial orientation of the field controller to be determined. The field controller supports a geodetic target object and has a distance-measuring unit that measures the distance between the field controller and a target point, the distance being optically marked by the field controller, as a result of which a 3D point cloud is generated without physical contact to a target point. When surveying a specific terrain region, algorithms analyzing the 3D point cloud are saved in a control and evaluation unit of the field controller. The absolute position of the target point is calculated from the data of the spatial orientation of the field controller, the distance between field controller and target point and the absolute position of the geodetic target object.

22 Claims, 6 Drawing Sheets

(56) References Cited

U.S. PATENT DOCUMENTS

2005/0057745 A1* 3/2005 Bontje ................. 356/139.03
2013/0162469 A1* 6/2013 Zogg et al. ............ 342/357.25
2014/0233010 A1* 8/2014 Baldwin et al. ........... 356/4.01

FOREIGN PATENT DOCUMENTS

| EP | 2431708 | * | 3/2012 | ............ G01S 19/42 |
| WO | 01/09642 A1 | | 2/2001 | |
| WO | 2008/067349 A2 | | 6/2008 | |

* cited by examiner

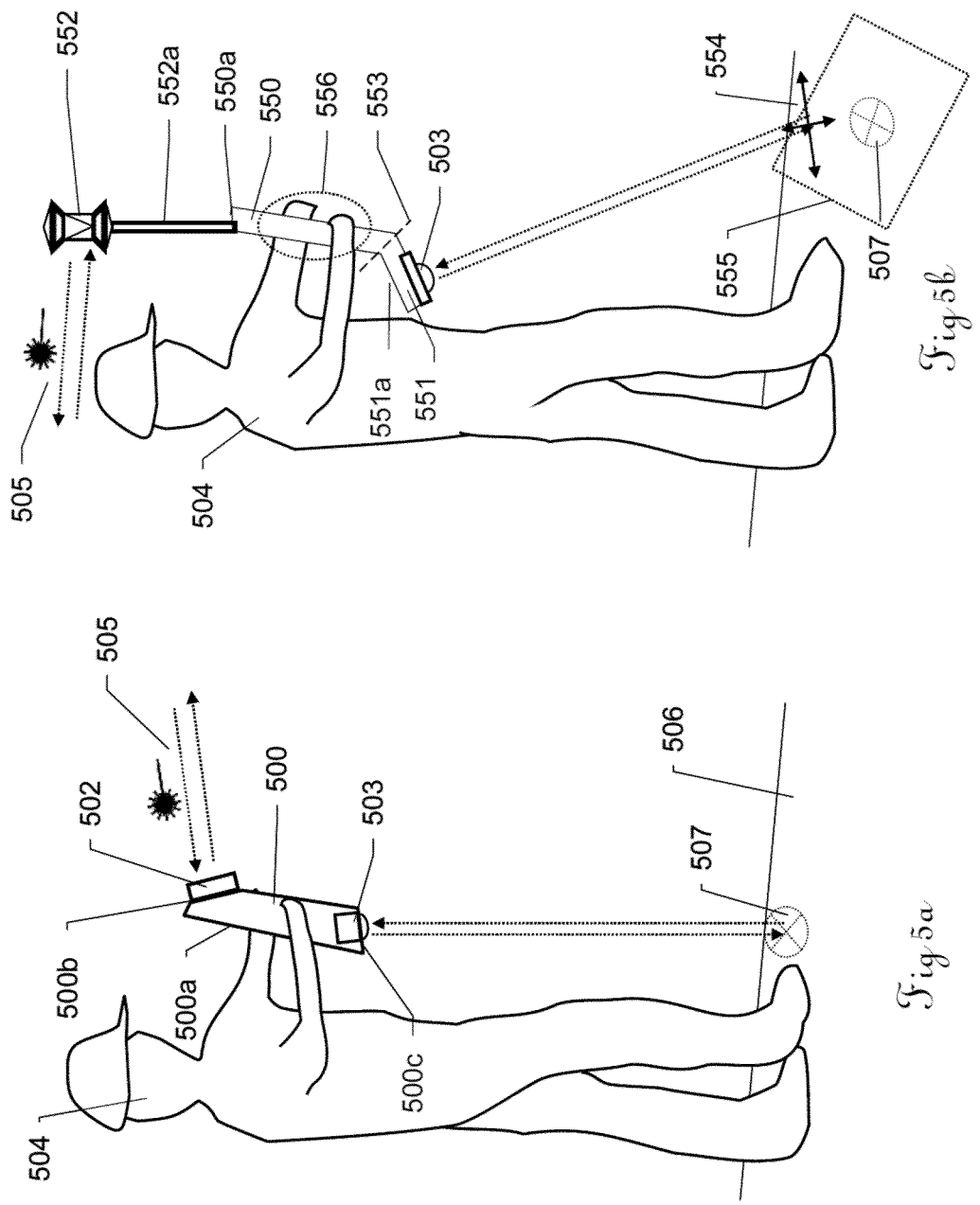

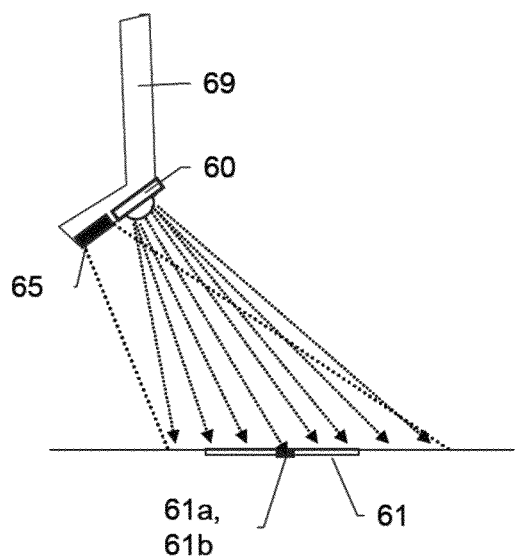
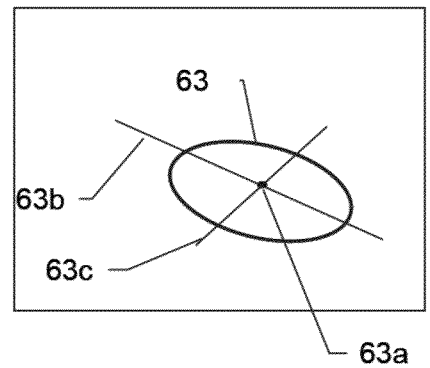
Fig 6a
Fig 6b
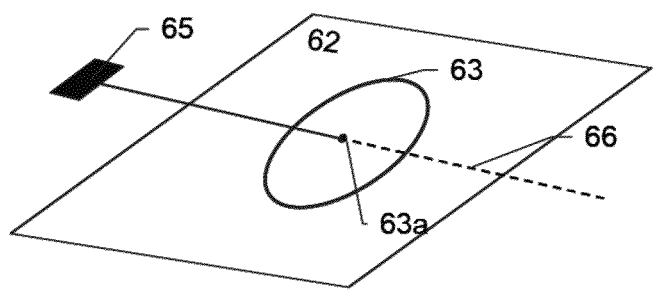
Fig 6c
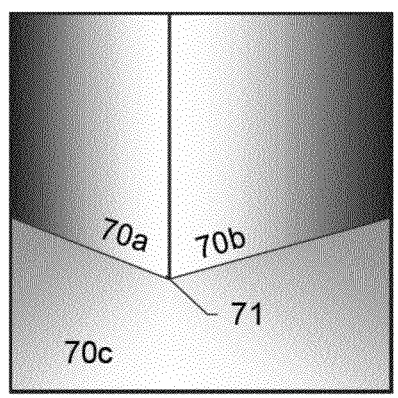
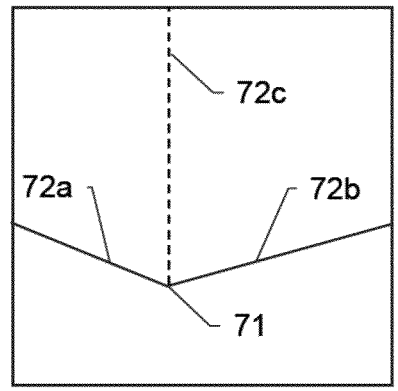
Fig 7a
Fig 7b

MOBILE FIELD CONTROLLER FOR MEASUREMENT AND REMOTE CONTROL

FIELD OF THE INVENTION

The invention relates to a mobile field controller that can be hand-held, which forms a system for geodetic surveying together with a remote controllable geodetic surveying device.

BACKGROUND

In order to survey one target point or, in particular, a plurality of target points, numerous geodetic survey devices have been known since antiquity. Here, distance and direction or angle from a surveying device, the absolute position of which is known, to the target point to be surveyed are recorded as spatial standard data. Well-known modern examples of such geodetic surveying devices are tachymeters and total stations, which are also referred to as electronic tachymeter or computer tachymeter. A geodetic surveying device from the prior art is described in e.g. EP 1 686 350.

It is often the case that the target point, e.g. a boundary marker, cannot be directly targeted by the surveying device due to obstacles which interrupt the line of sight. Hence, points are surveyed in a number of geodetic applications by virtue of specially embodied target objects being placed thereon. According to the prior art, these consist of a rod as object support with a marking that can be targeted or with a retroreflector as target object. For surveying purposes, the tip of this plumb rod with the target point is brought into contact with the ground and held perpendicular to determine the direction. In so doing, in order to determine the distance, the rod will be aligned horizontally in such a way by rotating it about its vertical axis that the marking or the reflector reflects a light signal emitted by the surveying device back in the direction of the latter. Alternatively, use is made of 360° reflectors, which reflect light signals back from any horizontal alignment. This procedure requires two users: one to operate the surveying device and one to place and hold the target object.

In order to enable geodetic surveying by a user on his own, total stations according to the prior art have means for mechanizing the target optical unit, for automated target search and tracking and for remote control of the whole device, as a result of which measurements can be performed by means of a suitable remote control unit from the target point. Modern total stations moreover contain microprocessors for digital further processing and storing of registered measurement data and a radio data interface for establishing a radio connection to external peripheral components such as e.g. a data-registering device, which can be embodied as a field computer in particular. By means of the data interface, it is possible to emit measurement data registered and stored by the total station for external further processing, to read externally registered measurement data into the total station for storage and/or further processing and to input or output remote control signals for remotely controlling the total station or a further external component, particularly in mobile field use. Modern devices can have a camera, for registering an image, aligned in a target direction, wherein the registered image in particular can be displayed as live image on the display of the display/control unit and/or on a display of the peripheral device used for the remote control, such as e.g. a field computer.

Here, a target reflector can be targeted by means of, in particular, this live image displayed to the user in the display of the remote control unit. Accordingly, the user can correspondingly align the total station on the desired target that can be identified in the live image on the basis of the live image.

In the prior art, appropriate peripheral devices suitable for remote control have radio data interfaces for wireless communication and data transfer with the total station or other external devices and control units with appropriate control software. Received data can be evaluated by means of an evaluation unit and displayed to the user by means of an output means, e.g. an electronic display. Furthermore, the user can communicate with the remote control unit and, thereby, with the surveying device by means of input means such as e.g. a keyboard or a touch-sensitive display. Hence, the user is able to initialize and perform measurements from the target point to be surveyed, and to register the results thereof. By storage in the total station, the field controller or an external memory, access to data is possible at a later time. Examples of such devices are the field controllers CS10 and CS15 by Leica Geosystems.

A one-person measurement system is obtained from the combination of geodetic surveying device, remote control unit and target object support. In this case, the target object support is usually also used as support for the remote control unit, i.e. the field controller can be attached to the plumb rod by means of an appropriate holder.

In general, a disadvantage of using such a rod for geodetic surveying is that conveying and carrying a rod, which is generally more than two meters long and therefore unwieldy, is cumbersome to the user and laborious in terrain that is difficult to pass, e.g. a wooded area. Moreover, perpendicular set up of the rod is connected to a certain amount of time expenditure and perpendicular holding during the measurement is arduous for the user. Incorrect setup of the rod at the target point is a source of error for an incorrect determination of position. A further disadvantage is that target points in a geodetic survey could lie in such a way that perpendicular positioning of the rod on the target point is impossible or that it is even impossible to establish physical contact, e.g. if the target point is a corner of a building, if visual obstacles, e.g. bushes and trees, are present between the total station and the target object or if the surroundings of the target point cannot be entered by the user. Such situations require specific measurement methods, which are connected to additional time expenditure.

U.S. Pat. No. 6,381,006 B1 discloses a method and a corresponding device, by means of which surveying of inaccessible target points is possible. To this end, a plumb rod is equipped with at least two sensor elements, the absolute positions of which are determined by means of one or more reference stations, e.g. a geodetic surveying device. Furthermore, the plumb rod has a distance-measuring device, which measures the distance between distance-measuring device and a target point to be surveyed. The positions of the sensor elements and of the distance-measuring device relative to one another and the orientation of the distance-measuring direction are known. Hence, it is possible to calculate the absolute position of a target point from the measured distance and the measured absolute positions of the sensor elements.

However, this method does not avoid the above-described disadvantages connected with the use of a plumb rod. Furthermore, it is disadvantageous that at least two sensor elements are required for determining the absolute position, which moreover must have a certain minimum distance between one another for sufficient resolution accuracy. As a result, the plumb rod becomes even more unwieldy, which is also indicated by the remark in U.S. Pat. No. 6,381,006 B1 that, preferably, attention is paid to a balanced arrangement of the components in respect of weight distribution.

U.S. Pat. No. 5,903,235 discloses a geodetic surveying device that can be hand-held, with which surveying can be performed without use of a geodetic surveying device having a distance and direction measurement functionality and without use of a plumb rod. Here, the target point to be surveyed is targeted by a pointing unit, e.g. a laser pointer. The position of the surveying device relative to the target point is established firstly by measuring the distance between device and target point in a defined direction by means of an integrated distance-measuring unit. In so doing, there is no need to align the device perpendicularly over the target point since a component which determines the inclination relative to the gravity vector is integrated. The absolute position of the surveying device is determined by a GNSS reception unit, as a result of which it is ultimately possible to calculate the absolute position of the target point due to the preceding measurements. Thus, handling of a plumb rod is dispensed with and it is possible to survey target points that could not be contacted physically by a plumb rod.

However, even when using correction signals, GNSS-based systems only enable a less accurate determination of the position of target points than systems based on the use of the distance and direction measurement functionality of a corresponding geodetic surveying device. Moreover, determining the position is bound to receiving a sufficient number of GNSS signals, which is not always the case, e.g. when tunneling or in narrow road lines.

SUMMARY

It is therefore an object of the present invention to provide a device that can be hand-held, which enables a system for geodetic surveying of target points on the basis of distance and direction measurements by having a geodetic target object together with a geodetic surveying device having a distance and direction measurement functionality.

It is furthermore an object of the present invention to provide a device that can be hand-held, by means of which geodetic surveys can be carried out without establishing physical contact to a target point or terrain point in the direct vicinity thereof, in particular without using a plumb rod. Here, a terrain point is also to be understood to mean a point on objects, such as buildings, produced by humans.

The subject matter of the invention is a mobile field controller that can be hand-held, which can be used for remote control of a geodetic surveying device, in particular a total station or a tachymeter, having a distance and direction measurement functionality, such that position surveying of geodetic target points is carried out using the distance and direction measurement functionality of the surveying device by one user alone, without, to this end, physical contact being established with a target point or terrain point in the vicinity thereof. The target point can be marked optically by the field controller according to the invention.

The field controller furthermore comprises a control and evaluation unit with input and output means for guiding the user, more particularly an electronic display which can be touch sensitive.

The majority of the input and output means is applied in this case to the housing front side. Furthermore, the field controller has components for data transfer, more particularly a radio data interface for remotely controlling the surveying device and receiving data therefrom.

According to the invention, the field controller has a geodetic target object, which can be targeted by the geodetic surveying device and the target position of which can be determined very precisely by the surveying device by means of a direction-based and laser beam-based distance measurement, with said target object in particular being developed as a retroreflector.

According to the invention, the field controller furthermore comprises a housing that can be hand-held. The housing that can be hand-held is a support of the geodetic target object. To this end, the housing has features which ensure a permanent connection of the target object to the housing and which satisfy the requirements for use in the field. Depending on the embodiment of the field controller according to the invention, the housing and the target object form one unit, and so the target object cannot be removed from the housing, or at best be removed for maintenance purposes. Alternatively, the field controller is embodied in such a way that the target object is fastened to the housing in an interchangeable manner such that different target object embodiments can be fastened to the housing. Depending on the embodiment of the field controller according to the invention, the target object is fastened directly on the housing or in a corresponding recess of the housing or the target object is supported by the housing via an attachment fastened to the housing, more particularly a distance holder with a length of 5 cm to 25 cm. Depending on the embodiment of the field controller, the distance holder can likewise be interchangeable, with the distance holder then in particular having an encoding, by means of which the control and evaluation unit can automatically establish the length of the distance holder.

The field controller according to the invention comprises a distance-measuring unit, more particularly a unit for measuring distance by electroacoustic or electrooptic means, by means of which the distance between field controller and at least one terrain point, in particular at least one target point, can be measured contactlessly. By way of example, the distance-measuring unit according to the invention can be embodied as laser rangefinder, with the laser advantageously emitting visible light, as a result of which a target point can also be marked optically by the laser rangefinder. If the measuring direction is not predefined but rather modifiable in the specific embodiment of the field controller, the respective measurement direction is determined by the distance-measuring unit.

According to the invention, the spatial position of geodetic target object and distance-measuring unit is known relative to a reference point of the field controller, i.e. a field controller-internal reference system, and stored in the control and evaluation unit or said position is measurable and can be saved in the control and evaluation unit.

The arrangement of the distance-measuring unit and of the geodetic target object in or on the housing is configured in such a way that ergonomic handling of the field controller is ensured. According to the invention, distance-measuring unit, or at least the signal transmission and reception part thereof, and geodetic target object are, to this end, preferably placed on housing sides other than the housing front side in such a way that the user can comfortably hold the field controller at a target point and it is simultaneously possible for the target point, the distance of which from the field controller is measured, to be optically marked and for the target point to be targeted by the surveying device, in particular if the target point is a point on the ground. Preferably, target object and distance-measuring unit are, according to the invention, not arranged on the same housing sides. Since an arrangement of the target object which is as far away from the ground as possible is to be preferred for reasons of targetability, the target object is fastened to a housing side which is defined as "the top" or fastened to a housing side in a region which defines "the top", while the distance-measuring unit is preferably arranged on an opposite "lower" housing side or side region, since points on the ground are generally to be surveyed.

According to the invention, for ergonomic handling, the units are, in respect of the weight distribution, advantageously arranged in or on the housing in such a way that the center of gravity of the field controller is situated on the longitudinal axis thereof, close to the housing center at which the user holds the field controller. To this end, a large retroreflector in particular, due to the relatively high weight thereof, is fastened to the housing in such a way that the torque thereof relative to the housing center is low during regular user handling of the field controller. This is achieved by virtue of an arrangement close to the housing and/or such an arrangement that the weight vector of the retroreflector has the direction to the center of gravity of the remainder of the field controller. To this end, the retroreflector, for example, can be fastened to one housing side in such a way that the longitudinal axis thereof forms an angle significantly less than 90°, for example 45°, with the side plane. In a special embodiment of the field controller according to the invention, the geodetic target object is fastened to the housing by means of a joint such that the alignment of the longitudinal axis thereof is variable within a specific angular range in at least one direction in order to design the arrangement of the target object to be optimizable by the user in respect of weight distribution and/or targetability. In particular, the joint has position sensors in this case, which measure the alignment of the longitudinal axis in order to render it possible to determine the spatial position of a geodetic target object relative to a reference point of the field controller.

Furthermore, the field controller has features, as a result of which it is possible to determine a spatial orientation of the field controller itself, either by the field controller on its own or in the system with the geodetic surveying device. In particular, the field controller according to the invention has inclination sensors or accelerometers to this end and/or a unit that can be optically sighted by the surveying device, by means of which unit the spatial orientation can be determined, at least in part, by comparison with a reference alignment of e.g. a laser beam.

The known spatial orientation of the field controller can be employed to enable less restricted handling of the device with a special embodiment of the field controller according to the invention, in which the latter has a plurality of geodetic target objects. To this end, respectively one geodetic target object is preferably attached to each housing side. Since the alignment relative to the surveying device is also known from the spatial orientation, there can be a unique assignment of which target object is targeted. Targeting a different target object therefore does not constitute a loss of positional information, enabling a change in the alignment or, using an appropriate surveying device, an automated selection of the target object that can be targeted best.

According to the invention, the control and evaluation unit is developed in such a way that all steps required for position surveying—apart from, naturally, the manual setup of the surveying device at the start—can be triggered, controlled and monitored by the field controller in a manual or automated manner by means of saved routines. According to the invention, the control and evaluation unit is preferably developed in such a way that it registers and/or provides and evaluates all (measurement) data required for calculating the position of a target point, and outputs to the user and saves the position of a target point while still at the surveying location.

It is possible to carry out geodetic surveying at the location of a target point using the field controller. To the extent that the surveying device still needs to be provided with control commands after said surveying device has been set up, these commands can be transmitted wirelessly in a manual or automated manner by means of the field controller. For surveying purposes, the user with the field controller proceeds to the target point or into the vicinity thereof. At least one target point is marked optically by the field controller. The geodetic coordinates of the target point are determined on the basis of three separate measurements, which will be described below.

One measurement determines the distance between the target point and the field controller. This is to be understood to mean the distance between the target point and a point of the field controller-internal reference system. If the measuring direction has not been predefined, it is additionally determined in order to determine the coordinates of the target point in respect of the reference system uniquely. A second measurement determines the spatial orientation of the field controller, i.e. inclination, roll, yaw or azimuth angle, and hence the spatial orientation of the reference system relative to the absolute external reference system. A third measurement is performed by the surveying device, as a result of which the position of the geodetic target object is determined in the absolute reference system. The absolute position of the target point is calculated from the absolute position of the geodetic target object by means of the determined spatial orientation of the field controller and the target point-field controller distance knowing the position of the geodetic target object in the field controller-internal reference system.

In an alternative embodiment of the field controller according to the invention, the latter is developed in such a way that it is not the distance to the field controller from an individual terrain point that is surveyed, but that a 3D point cloud is established around a terrain point within a specific contiguous region. To this end, there are different implementation options:

If measurement values are recorded continuously, it suffices, in the simplest case for this, that the user simultaneously moves the field controller within a specific region. The many individual items of absolute position data of the surveyed terrain points are combined to form a 3D point cloud by the control and evaluation unit.

In an advanced embodiment of the distance-measuring unit, the latter is developed as laser scanner which surveys a multiplicity of terrain points of a defined contiguous region in respect of direction and distance, for example by virtue of a laser beam being guided over the region by means of a moving mirror, and stores this region as 3D point cloud.

Alternatively, the distance-measuring unit can be developed as range image (RIM) camera for recording three-dimensional images, which camera respectively assigns depth information to a multiplicity of pixels in a specific field of view and thereby generates a 3D point cloud.

A 3D point cloud can also be generated by means of a stereo camera, a light structure 3D scanner or further appropriate devices from the prior art or by a combination of the various devices.

Therefore, according to the invention, a 3D point cloud can be referenced in absolute terms as a whole. In the first variant of those mentioned above, this occurs automatically since the point cloud is composed of many points which have already been referenced absolutely. In the other options, this occurs by calculation using the values of one or more absolute position measurements and orientation determinations. Such a procedure may be desired if, for example, many target points lie close together in the case of a survey in a small space.

Furthermore, the 3D point cloud can be evaluated in such a way that the coordinates of a target point can be determined in respect of the internal reference system as an alternative to direct position surveying. According to the invention, in order to evaluate the 3D point cloud in this respect, appropriate algorithms are saved in the control and evaluation unit of the alternative embodiment of the field controller according to the invention. Using these, it is possible to identify specific geometric terrain properties such as e.g. a ground plane or a plane formed by a house wall. In particular, algorithms are stored, by means of which specific geometric basic shapes, for example straight lines, can be found, which can be assigned to specific terrain forms such as streets or house walls. Using this, a target point such as e.g. a house corner can be identified as point of intersection between the two planes formed by the house walls and the plane formed by the ground. The coordinates of such a target point in respect of the internal reference system emerge directly from the scanning or RIM data by virtue of the distance measurement data of the identified target point being adopted. By way of example, if there is no data available directly of the target point and if the terrain does not have discontinuities within a defined small spatial zone around the target point, the measurement data of a terrain point in this zone also can be used as target point coordinates or the target point coordinates can be interpolated from the coordinates of surrounding points.

Alternatively, according to the invention, it is possible, following a geometric image analysis of the 3D point cloud, to calculate target point coordinates by means of extrapolation of fitted geometric figures, for example as extrapolated point of a path or by virtue of a target point being considered to be a point with specific geometric properties. By way of example, a house corner can be considered to be a point of intersection of three planes which are formed by the two walls and the ground. Accordingly, three plane equations, which offer the best possible fit with the measurement data, are calculated on the basis of the data from the 3D point cloud and the point of intersection of the three planes is calculated. The calculated coordinates thereof are output as target point coordinates.

If the field controller according to the invention additionally has a digital camera which records a 2D image corresponding to the scanning region or field of view, it is possible to use established target point coordinates to output on the electronic display of the control and evaluation unit a 2D image on which the target point is superposed such that the target point is marked optically. The user can initiate an input about this, for example data storage, data correction or triggering a further measurement. By way of example, an RIM recording can be used for a first rough measurement for identifying the target point in order subsequently, after target point selection by the user, in particular by means of a touchscreen, to undertake a second, more exact distance measurement by a laser rangefinder.

If the field controller according to the invention comprises a 2D camera, an optical marking of a target point can also easily be carried out by a distance-measuring unit in such a way that a reticle which displays the current targeting point of the distance-measuring unit is superposed on the 2D image. To this end, the offset between camera axis and measurement axis of the distance-measuring unit must be known. If the field controller according to the invention has a distance-measuring unit with a modifiable measuring direction, in order to align the measuring direction to a target point, the reticle display can conversely be used by the user by coupling with the distance-measuring unit and corresponding control mechanisms.

Other points or geometric figures established by the control and evaluation unit can also be superposed onto such a 2D image. Such points or figures could also have been established by image processing from the 2D image itself. To this end, algorithms for digital image processing, e.g. Hough transforms or edge extractions, are stored, which algorithms analyze the image data in respect of geometric forms and calculate e.g. points of intersection therefrom. Such a point of intersection can be the sought-after target point, the distance of which can then be measured automatically by e.g. a laser rangefinder. Alternatively, one or more calculated points can be displayed on the display so that the user manually selects a possible target point for determining the distance, or the user can monitor and optionally correct fitted geometric figures.

BRIEF DESCRIPTION OF THE DRAWINGS

The field controller according to the invention will be described in more detail below on the basis of embodiments and application procedures depicted schematically in the drawings. In detail:

FIGS. 5a-b show two application examples using different arrangements and developments, according to the invention, of geodetic target object and distance-measuring unit on or in the housing, FIGS. 6a-c show an application and evaluation example of a field controller according to the invention with a digital camera, a distance-measuring unit for establishing a 3D point cloud and a control and evaluation unit with saved algorithms for analyzing the 3D point cloud, and FIGS. 7a-b show a further example for evaluating data for measuring the distance by means of a field controller according to the invention with a digital camera, a distance-measuring unit for establishing a 3D point cloud and a control and evaluation unit with saved algorithms for analyzing the 3D point cloud.

DETAILED DESCRIPTION

Figure 1:
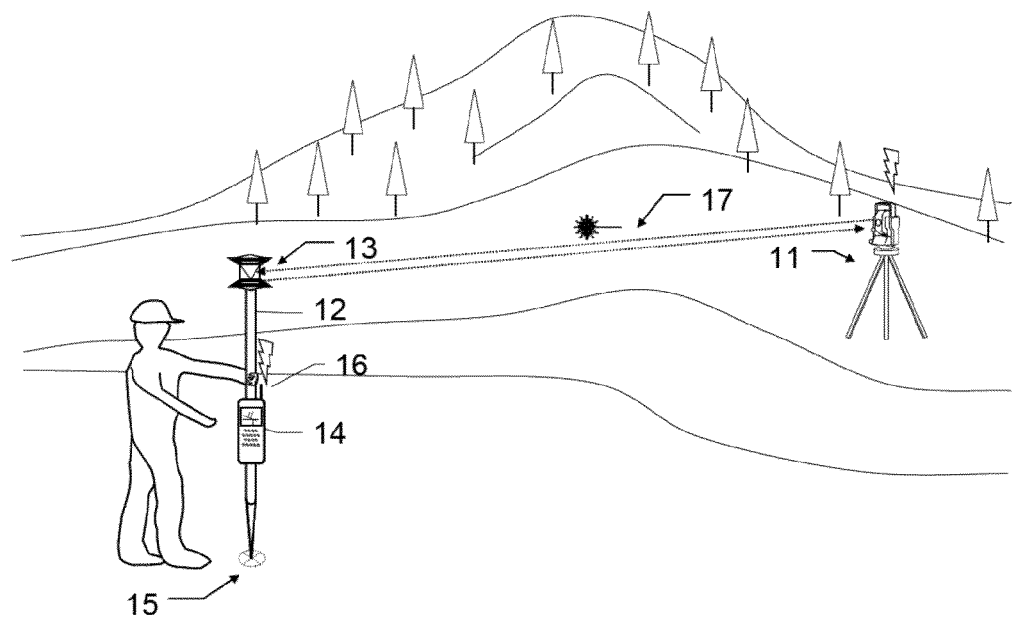
FIG. 1 shows a drawing of a geodetic surveying using a one-person surveying system according to the prior art, consisting of a remote controllable surveying device, plumb rod and field controller.

FIG. 1 shows an example for a geodetic survey using a one-person measurement system according to the prior art. After setting up and aligning the total station 11, the plumb rod 12 of known length, which supports the reflector 13 and the field controller 14, is transported to the target point 15 to be surveyed. There, the plumb rod 12 is held perpendicular on the target point 15. Subsequently, the distance and direction measurement to be performed by the total station 11, in particular the transmitting and receiving of the laser beam 17 for distance measurement, is triggered in a manual or automated manner by remote control 16. The absolute target point position is calculated from the measured absolute reflector position and the known reflector/target point distance.

Figure 2:
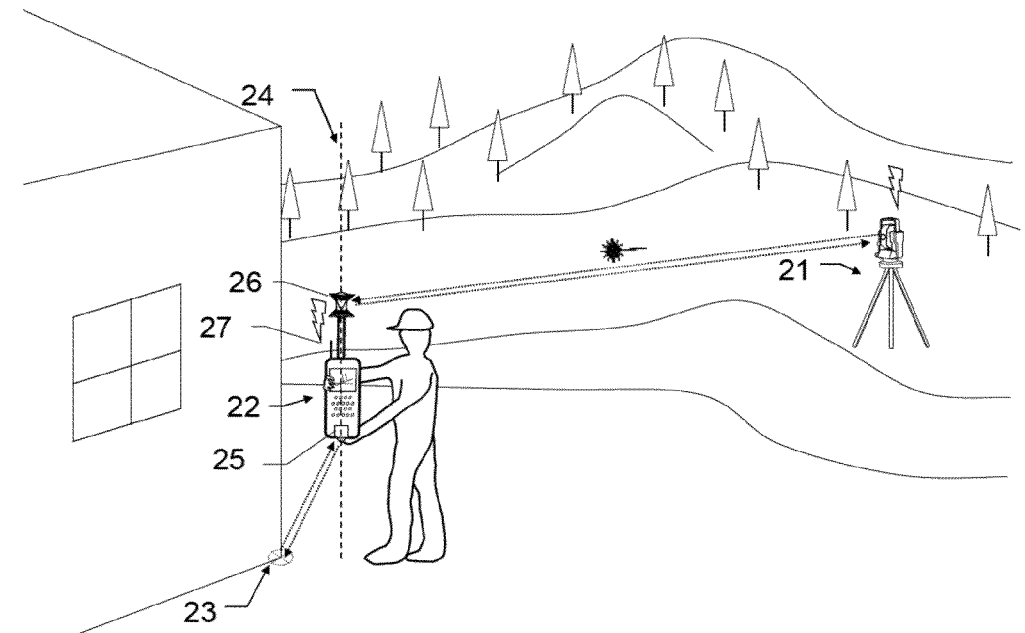
FIG. 2 shows a drawing of a geodetic surveying using a one-person surveying system, consisting of a remote controllable surveying device and field controller according to the invention.

FIG. 2 shows a geodetic survey using a one-person measurement system consisting of a total station 21 and a field controller 22 according to the invention. Setup and alignment of the total station is performed like in the prior art. In contrast to a surveying system according to FIG. 1, there now no longer is the need to transport an unwieldy rod to the target point as a result of the field controller 22 according to the invention. Moreover, such a rod cannot be placed perpendicularly on the exemplary target point 23, which is a house corner. In the depicted example, a perpendicular alignment of the field controller 22 according to the invention, i.e. of the longitudinal axis 24 thereof, over the target point 23 is not required since the measurement direction of the distance-measuring unit 25, which measures the distance between field controller 22 and target point 23 required for calculating the position of the target point, need not be parallel to the gravity vector but can, in principle, have any orientation thereto. It merely needs to be known for calculating the position. Similarly, according to the invention, it is possible to avoid the necessity of a perpendicular alignment over the target point 23 by virtue of the geodetic target object 26 not being aligned along the longitudinal axis 24, but rather being aligned in a known oblique position thereto (not depicted in FIG. 2). The only requirements for position and spatial orientation of the field controller 22 according to the invention are that the geodetic target object 26 can be targeted by the total station 21 and that the distance-measuring unit 25 can measure in the direction of the target point 23. If the field controller 22 is positioned thus, it is possible to carry out surveying completely from this position by means of the field controller 22 and installed remote control 27.

Figure 3A:
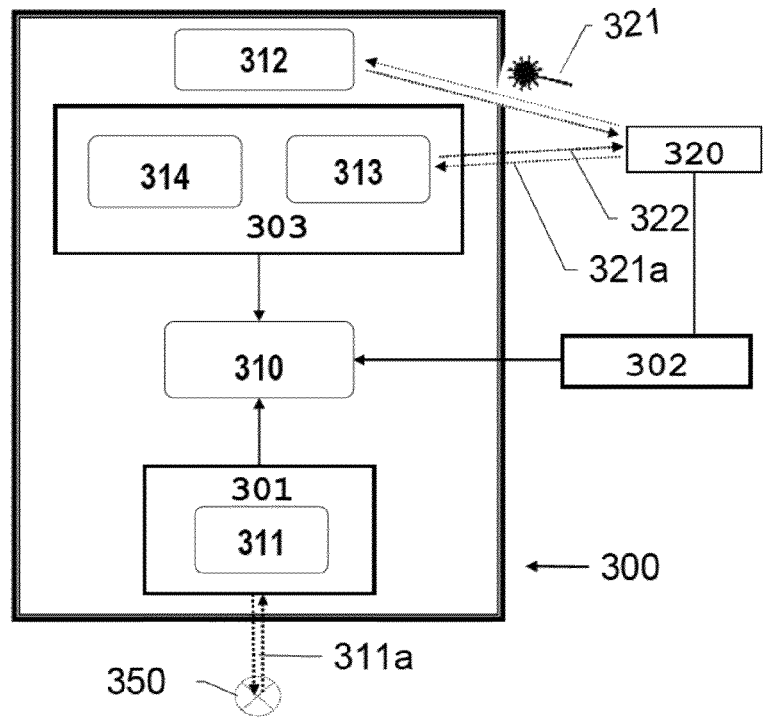
FIG. 3a shows a diagram of the individual measurements of a geodetic survey using a system comprising geodetic surveying device and field controller according to the invention.

FIG. 3a schematically shows the individual main phases of a geodetic survey for determining the position of a target point 350 using a system comprising a geodetic surveying device 320 according to the prior art, for example a total station, and a field controller 300 according to the invention. In order to calculate the absolute position of the target point 350, it is necessary, in principle, to supply the control and evaluation unit 310 with data 301 of the distance between field controller 300 and target point 350 or of the position of the target point 350 relative to the field controller 300, data 303 relating to the spatial orientation of the field controller 300 and data 302 relating to the absolute position of the target object 312. A data transfer, e.g. of control signals, from the control and evaluation unit 310 to the distance-measuring unit 312, to the unit 313 that can be sighted optically and to the surveying device 320, which may be necessary depending on the device configuration, has not been drawn for reasons of clarity.

The absolute position of the geodetic target object 312 is the linking point to the external, absolute reference system. This position is determined by position surveying by means of the geodetic surveying device 320 according to the prior art, in which the direction angles and, by means of a run time measurement and/or phase measurement of a laser beam 321 emitted by the surveying device 320, the distance of the target object 312 are measured relative to the known absolute position of the surveying device 320, by the surveying device 320. The absolute position of the target object 312 is calculated from angle and distance and absolute position of the surveying device 320. This calculation generally occurs in an evaluation unit of the surveying device 320, and so the surveying device 320 transfers the absolute position data of the geodetic target object 312 to the control and evaluation unit 310 of the field controller 300. However, according to the invention, it is also possible for the measurement data to be transferred to the control and evaluation unit 310 of the field controller 300 and for the absolute position of the target object 312 to be calculated there.

According to the invention, the internal reference system of the field controller 300 is linked to the absolute position. To this end, the position of the geodetic target object 312 is known within this reference system or, if the alignment thereof can be changed relative to the housing and hence relative to this reference system in the specific embodiment of the field controller 300, measurable by corresponding angle sensors in the field controller 300.

For the unique determination of the position of the internal reference system relative to the absolute reference system, knowledge about the alignment of the internal reference system is additionally necessary, i.e. knowledge about the spatial orientation of the field controller 300. According to the invention, these orientation data 303 are determined by inclination sensors and/or accelerometers 314, which measure pitch and roll angle and are situated in the field controller 300, in particular in combination with one or more gyroscopes. The missing yaw angle can be determined by e.g. a compass and, in particular, in combination with a gyroscope, which may be comprised by the field controller 300 according to the invention.

Additionally, or as an alternative thereto, the inclination angle and/or the yaw angle can be determined by means of the surveying device 320 using a unit 313 that can be sighted optically of the field controller 300. By way of example, this occurs by virtue of this unit 313 being developed as a optical pattern known in advance, the naturally emitted optical radiation 322 of which being recorded as an image by a camera situated in the surveying device 320, and by virtue of this recording being compared to a corresponding pattern stored in the surveying device 320 or field controller 300, as a result of which alignment angles can be established.

In another embodiment of the field controller 300 according to the invention, the unit 313 that can be sighted optically is developed as laser beam direction of incidence determination unit, which establishes the direction of incidence of a laser beam 321a, which may be identical to the laser beam 320, emitted by the surveying device in a defined direction. To this end, the unit that can be sighted optically can be linked to the geodetic target object. WO 01/09642 A1 describes such a retroreflector, which comprises an opening through which part of the laser beam emitted by the surveying device can pass and be incident on a light-sensitive position sensor. Alternatively, the laser beam direction of incidence determination unit can be configured as, for example, a laser beam detector with a plurality of detection zones, which segment the registration region into a plurality of partial registration regions. A point of incidence of the laser beam on the detector can be determined on the basis of receiving the beam within a detection zone. Each detection zone is directly linked to a planar angle corresponding to a partial registration direction, as a result of which pitch and yaw angle of the field controller can be determined (the references relate to the absolute reference system).

If surveying is carried out under the premise that the field controller is held by the user in a defined perpendicular alignment, the field controller can have simplified embodiment and the process of determining the orientation can be performed in a simplified manner. In such an embodiment, the field controller according to the invention need only have simple inclination indicators, e.g. mechanical inclination levels, as sensors for determining alignment angles, by means of which indicators the perpendicular alignment can be checked. If the distance-measuring unit is developed in such a way that the measurement direction thereof does not coincide with the perpendicular alignment but rather may form a specific angle thereto in such a way that a target point does not lie on a common perpendicular axis with the geodetic target object, the field controller according to the invention may have a sensor for determining the azimuth angle, e.g. a compass. It is then only necessary to determine this alignment angle from orientation data 303 during a survey.

From the preceding data 302, 303, which are transferred to the control and evaluation unit 310, the latter can therefore calculate a unique transformation prescription between absolute, external and internal reference system of the field controller 300, as a result of which internal coordinates of the target point 350 can be converted into absolute coordinates.

This internal position of the target point 350, i.e. the target point 350/field controller 300 distance, is determined by the distance-measuring unit 311, the position and alignment of which is known in the internal reference system. Said distance-measuring unit measures the distance between target point 350 and distance-measuring unit 311 by transmitting and receiving a measurement signal 311a, in particular laser radiation, along a known measurement axis. In the case of an embodiment of the field controller 300 with a changeable measurement axis direction, the latter is also determined.

The distance between field controller 300 and target point 350 or the relevant target point position data 301 is transmitted to the control and evaluation unit 310, which converts these into absolute coordinates of the target point 350 on the basis of the transformation prescription.

Figure 3B:
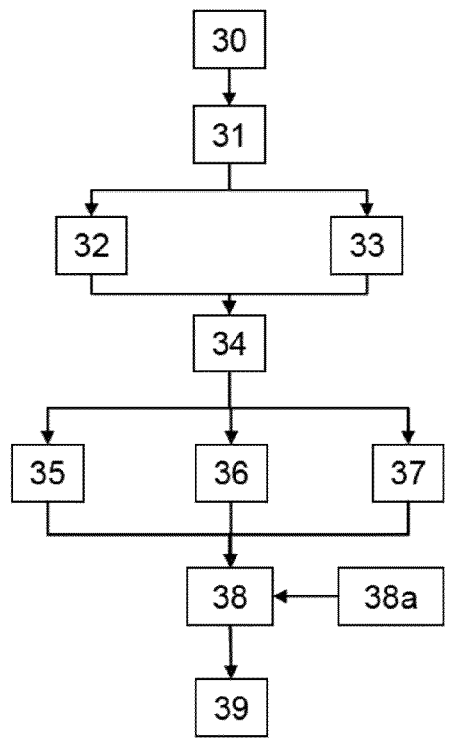
FIG. 3b shows a flowchart of an exemplary time profile of a geodetic survey using the field controller according to the invention.

FIG. 3b shows the time profile of a geodetic survey with field controller according to the invention and geodetic surveying device in an exemplary manner. After setting up and initializing the surveying device, 30, the user positions himself with the field controller at the target point, 31. There, the target point is marked optically in one of the above-described ways and sighted by the distance-measuring unit, 32. At the same time, or subsequently thereto, the geodetic target object is targeted by the surveying device, 33. If the surveying device has a tracking function, targeting is also possible continuously for as long as there is a visual connection between geodetic target object and surveying device.

Naturally, in order to establish correctly the target point coordinates, the same position and spatial orientation of the field controller must underlie the individual measurements of the orientation data, the target object position data and the target point distance data, i.e. the field controller must not be moved during a surveying process. In order to achieve this, the surveying process should be kept as short as possible, which is why the measurements are carried out in a synchronized manner. To this end, a trigger signal is output to the measuring units, said trigger signal being triggered by the user, the control and evaluation unit or one of the measuring units, 34. This triggers synchronized measurements of the distance between field controller and target point or the position of the target point relative to the field controller by the distance-measuring unit of the field controller, 35, of the spatial orientation of the field controller by the field controller and/or the geodetic surveying device, 36, and of the absolute position of the target object by the geodetic surveying device, 37. By way of example, the user can mark the target point optically using the field controller and subsequently transmit a start signal, which triggers synchronized measurements, to the control and evaluation unit by means of the input means.

Since a hand-held device cannot be held completely still, even in the case of a short measuring process, a compensation of such fluctuation movements, a tremor compensation, can be provided. This can be brought about by virtue of the fact that, during a surveying pass, many measurement values are recorded by the respective measuring units over a short period of time, e.g. 5 seconds, and that a mean value is formed in each case from these. This is readily possible in the case of the respective measuring units according to the prior art or is usual procedure in any case during the distance measurement by using total stations. Instead of averaging the measurements of the individual measuring units and determining the target point coordinates therefrom, it is alternatively also possible to calculate target point coordinates in each case from the many individual measurements and subsequently to form a target point coordinate mean from said target point coordinates. In order to compensate for the fluctuation of the field controller as a result of manual triggering of a surveying process by pressing a button, triggering in respect of causing a measuring process can occur with time delay so that the user has time to hold the device largely still again.

Additionally, or as an alternative thereto, field controller and surveying device can have synchronized clocks, in particular GNSS-based clocks, as a result of which individual measurement data can be marked in terms of time, 38a. This allows surveying to be carried out, by virtue of measurements of the individual units occurring continuously and asynchronously, as a result of which a trigger unit becomes unnecessary. If sufficiently high measurement frequencies and time overlaps are provided, measurement data lying within a short, defined period of time can be considered as belonging together and target point coordinates can be calculated from these. As an alternative, measurement values can be interpolated or extrapolated on a common base time. A base time can be predefined independently, for example centrally by the control and evaluation unit, or can be defined by the recording time of a measurement value of one of the measuring units. The latter is preferably that measuring unit in which an extrapolation or interpolation would not be expedient due to value profiles that cannot be estimated or in which the extrapolation or interpolation would be afflicted by the greatest uncertainty.

The obtained data are transmitted to the control and evaluation unit, 38. From all data, the control and evaluation unit calculates the absolute coordinates of the target point and/or transmits these data and/or calculated coordinates to an external device, 39. In order to check the established (position) data, these can be shown to the user on the field controller display. Additionally, the field controller can be equipped with a GNSS receiver, and so an approximate plausibility check of the established position data can be carried out.

Figure 4A:
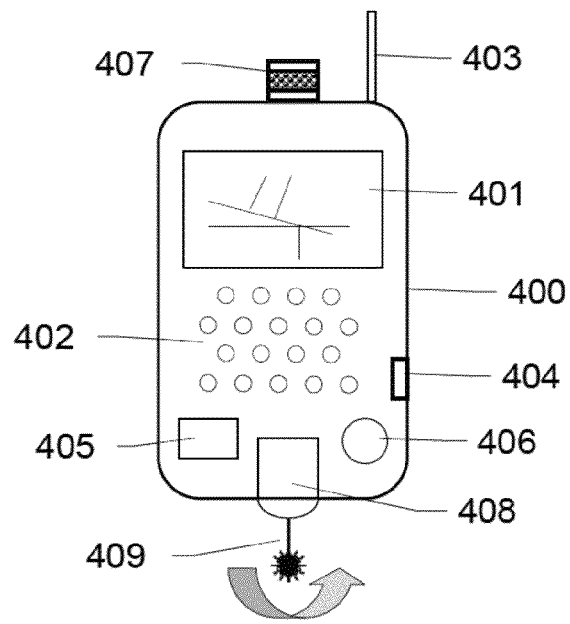
FIGS. 4a-c show two exemplary embodiments of the field controller according to the invention.

FIG. 4a schematically shows an exemplary embodiment of a field controller according to the invention. The handy housing 400 has an evaluation and control unit with an electronic display 401, which may have a touch-sensitive design, and a keyboard 402 as (further) input means on the housing front side. Furthermore, the field controller has a radio antenna for data transfer 403, in particular with and to the remote control of a total station, and a further data interface, e.g. a USB connector 404. The field controller moreover has a unit 405 for determining the spatial orientation, is developed as e.g. a 3-axis MEMS accelerometer or inclination sensor with liquid horizon, and moreover a compass 406. Seated on the housing 400 is a retroreflective object 407, which for example is configured as an adhered-on cylinder, with a retroreflective film being adhered to the lateral face of which. The dimensions and positioning of the reflector cylinder are defined relative to the internal reference system of the field controller and already stored in the evaluation and control unit integrated into the housing 400. Situated at the lower end of the housing is the distance-measuring unit 408, for example an ultrasound distometer with a laser pointer or a laser rangefinder, wherein the direction of the laser beam 409 relative to the housing can be modified by means of a pivot element in particular, e.g. a mirror arrangement, and so a specific target point can be marked and surveyed from different spatial orientations of the field controller and the user can select a measurement position expedient to him. The position of the zero point of the distance-measuring unit 408 relative to the internal reference system, and optionally the measurement direction, are defined or measurable.

Figure 4B:
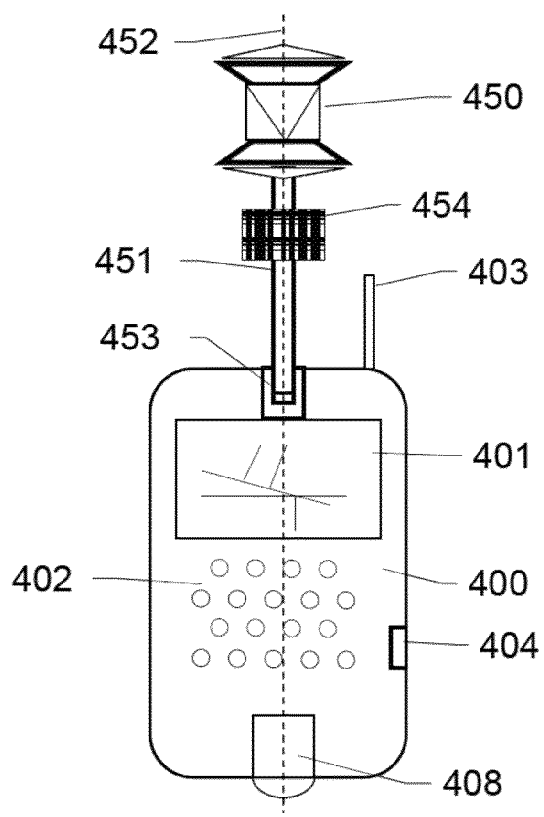

FIG. 4b schematically shows a further exemplary embodiment of a field controller according to the invention. In contrast to the example from FIG. 4a, the housing supports a prism reflector 450 on an attachment, a distance holder 451, wherein the longitudinal axis 452 of the reflector 450 extends centrally to the housing front side, parallel to the longitudinal axis of the housing 400 and lies as close as possible to the latter. The relative position of the reflector 450 is defined and either already stored in the evaluation and control unit integrated in the housing 400 or can be saved by the user. The field controller can also be designed as a unit with interchangeable reflector 450 or distance holder 451, in order to be able to be adapted to different surveying situations in a simple manner. In this case, a transmitter, e.g. an ID chip, can be installed into the reflector 450 or into the distance holder 451, and a signal receiver can be installed in the corresponding connection site on the housing, as a result of which the control unit automatically identifies the respective type and the survey-relevant dimensions of the reflector attachment 450/451. In order to align the reflector 450 more easily to a total station and/or for an optimized weight distribution, the connection site has a joint 453 which can be pivoted into at least one plane, which, in particular, is perpendicular to the housing front plane and contains the longitudinal axis of the reflector. At least one angle sensor, which for example operates using the incremental method, is installed into the joint 453 in order to determine the alignment angle or the alignment angles of the reflector 450 relative to the housing front plane and transmit this to the control and evaluation unit. A defined pattern 454, which can be recorded optically by a camera of the total station, is applied to the distance holder. A pattern corresponding to the pattern 454 is saved in the total station, and so it is possible to determine the spatial orientation of the pattern 454, and hence of the field controller, by a comparison with the image of the field controller pattern 454 recorded by a camera.

Figure 4C:
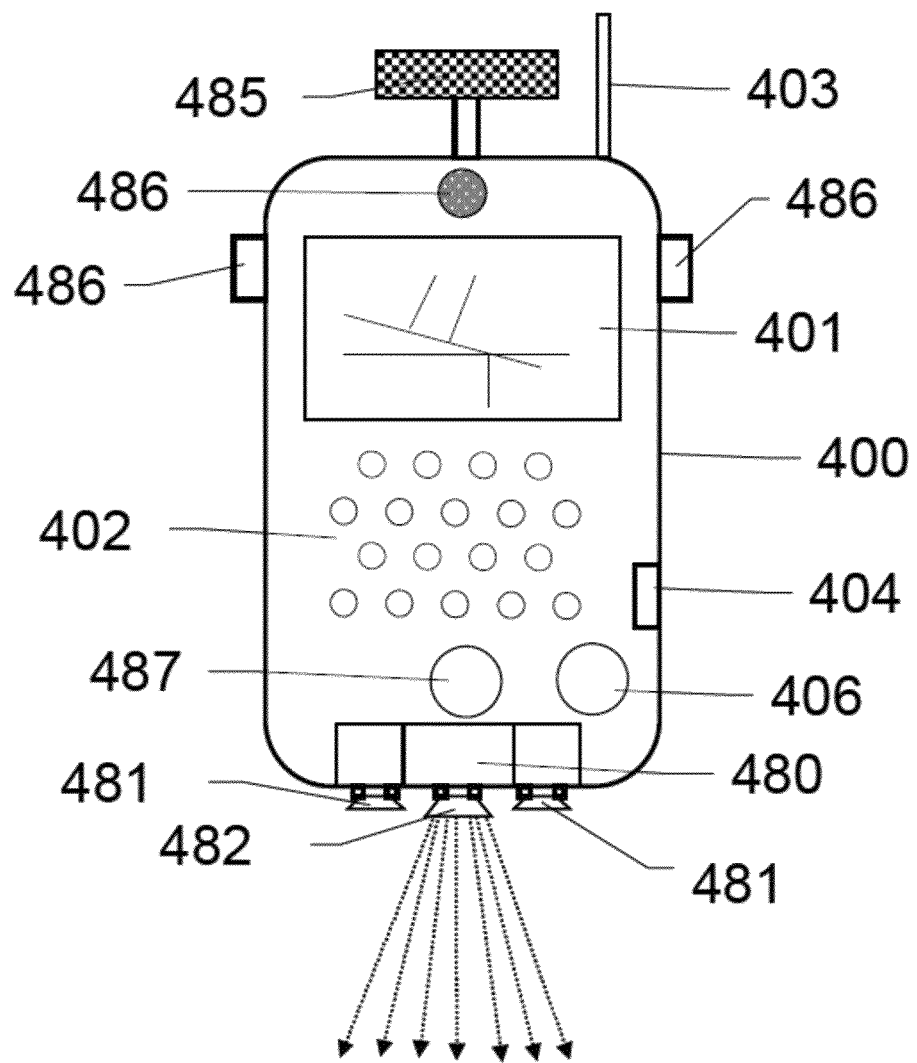

FIG. 4c schematically shows a third exemplary embodiment of a field controller according to the invention. The housing carries a unit that can be sighted optically, developed as laser beam detector 485 with a plurality of adjoining detection zones. A laser beam emitted by a total station is registered by the detector. When registering the laser beam within a partial registration region from at least one detection zone, the detector determines a point of incidence of the laser beam and derives a direction of incidence from the corresponding at least one partial registration direction. By linking the known direction of emission of the laser beam with the direction of incidence, the orientation of the detector, and hence of the field controller, is now determined. An alignment angle such as the azimuth angle, which cannot be established in this manner, is optionally established by a compass and, in particular, in combination with a gyroscope 487. The housing furthermore comprises a plurality of geodetic target objects, which are arranged on different housing sides and are developed as cylindrical retroreflectors 486. Using the perspective employed in FIG. 4c allows three reflectors 486 in two different views to be identified; at least one further one is advantageously attached to the housing rear side, which is facing away. It is possible to target the reflector positioned most expediently depending on the alignment of the field controller according to the invention relative to the surveying device. This reflector can be uniquely identified from the known orientation of the field controller and hence it is possible to calculate the correct absolute position of the suspension point of the field controller-internal reference system. In this example, the distance-measuring unit is developed as light structure 3D scanner 480. The pattern projector 482 illuminates the terrain region to be surveyed sequentially in time with different patterns, e.g. strip patterns. The two cameras 481, which are situated in a known spatial position with respect to one another and with respect to the pattern projector 482, receive the projected pattern under a known viewing angle with respect to the projection, wherein, in particular, the fields of view of the individual cameras largely overlap. The sought-after three-dimensional coordinates of a target point in the field controller-internal reference system emerge as a point of intersection of the plane formed by a projected strip with the straight line formed by a received light beam. The absolute position of a target point then emerges from the known absolute position and orientation of the reference system of the field controller. In principle, it is also possible to calculate in this manner the coordinates of all points of a terrain region, the distance of which from the field controller was determined, as a result of which a complete, absolutely referenced 3D point cloud is obtained.

FIG. 5a shows an application example of a field controller with an arrangement according to the invention of geodetic target object and distance-measuring unit 503 in a side view. The ratio of field controller to user 504 is only exemplary. The front side 500a of the housing 500 of the field controller points to the user 504. The target object is developed as a reflector 502, for example a round prism, which retro-reflects radiation 505 within a specific solid angle range. The round prism is fastened to an "upper" housing rear side 500b, and so the reflecting side thereof points away from the housing 500, parallel to this side. This "upper" housing rear side 500b is not parallel to the front side 500a, but slightly at an angle thereto, e.g. at a 20° angle in the direction of the front side 500a. The distance-measuring unit 503 is arranged in/on the housing 500 on a "lower" housing side 500c. Here, this housing side 500c is advantageously arranged at an angle of slightly less than 90°, for example 80°, with respect to the front side 500a. As a result, according to the invention, the user 504 can hold the field controller at a slight angle in such a way that the front side 500a is not perpendicular to the plane of the ground 506, but at a slight angle thereto, and the distance-measuring unit 503 can simultaneously survey a ground target point 507 directly next to the user and the reflector 502 can be targeted by a total station, which is situated at the same or a slightly higher elevation over the ground, and the position can be measured by means of laser radiation 505. Such an arrangement enables ergonomic handling of the field controller in respect of weight distribution and center of gravity of the device and in respect of operating the input means, e.g. a keyboard, and observing the output means, e.g. an electronic display.

FIG. 5b shows a further exemplary embodiment of a field controller with an arrangement according to the invention of geodetic target object and distance-measuring unit 503 in a side view. The ratio of field controller to user 504 is only exemplary. The housing is not developed as a single cube-like object, but "composed" of two flat cubes or cube-like prisms 550, 551, which are at an angle to one another (separated in the drawing by the line 553). The front side 551a of the "lower" cube 551, which is closer to the ground, can then have input means and the distance-measuring unit 503 on the underside thereof. In this arrangement according to the invention, the distance-measuring unit 503 can measure the distance to a target point 507, which is situated slightly in front of the user. If the measuring direction of the distance-measuring unit 503 can additionally be modified (indicated by the direction cross 554), the target point 507 can lie within a specific region 555 in front and to the side of the user location.

If the distance-measuring unit 503 is developed as laser scanner or RIM camera, it is possible to determine the distances to a multiplicity of terrain points within the region 555 and hence, if necessary, the absolute positions of all terrain points, as a result of which a complete, absolutely referenced 3D point cloud can be generated.

The front side of the "upper" housing part 550 of the field controller according to the invention can have an electronic display. Furthermore, the upper part 550 carries a 360° reflector 552, which is fastened to a distance holder 552a, which in turn is fastened to the "upper" housing side 550a. The distance holder 552a has a length which is sufficient for the reflector 552 to protrude over the head of the user 504 when the user 504 holds the field controller housing level with the chest/abdomen. As a result of this arrangement, the reflector 552 can also be targeted by a total station and the position thereof can be measured by laser beam 505 when the user has turned his back thereto and holds the field controller in front of him. Here, the position and the longitudinal axis alignment of the distance holder 552a are selected in such a manner that the weight vector of the reflector 552 points onto the region 556 in which the user holds the housing in order to generate as little torque as possible.

FIGS. 6a-c show an application example of a field controller 69 according to the invention with a digital 2D camera 65, a distance-measuring unit 60 for generating a 3D point cloud and a control and evaluation unit with saved algorithms for digital image processing and analysis of the 3D point cloud. In the example, the coordinates of the center point 61 a of a manhole cover 61 are intended to be surveyed. As shown in FIG. 6a, the center point is situated in a recess 61b of the manhole cover. The distance-measuring unit 60 scans a street region, which includes the manhole cover 61, and stores the measurement data as 3D point cloud. The latter is analyzed by means of the algorithms saved in the control and evaluation unit, as a result of which the plane 62 formed by the street and manhole cover is identified in a first step and the position thereof is calculated in the reference system of the field controller. The camera records an image of the street region, which image is processed digitally in order to identify or extract geometric forms. As depicted in FIG. 6b, the manhole cover is identified as an ellipse 63 or an ideal ellipse is fitted from the image data. Using appropriate algorithms, the center point of the ideal ellipse 63a is calculated subsequently from the point of intersection of the semi-major and semi-minor axes 63b and 63c. FIG. 6c graphically depicts that the sought-after field controller-internal coordinates of the manhole cover center point then emerge as the point of intersection between the line 66, which extends through the ellipse center point and the recording center of the 2D camera, and the plane 62 formed from the 3D point cloud data.

FIGS. 7a and 7b show a further evaluation example for a field controller according to the invention with a digital 2D camera, a distance-measuring unit for generating a 3D point cloud and a control and evaluation unit with saved algorithms for digital image processing and analysis of the 3D point cloud. The distance to a house corner 71 is intended to be measured. FIG. 7a graphically depicts the data from a distance-measurement measurement of the terrain region around the house corner 71, for example by using an RIM camera. Bright regions represent close points; dark regions represent points situated further away. An analysis of the 3D data in respect of the presence of geometric forms leads to the plane 70a, formed by the left house wall in the example, the plane 70b, formed by the right wall, and the plane 70c, formed by the ground, being found. FIG. 7b shows an image of the same terrain region, as recorded by the digital camera.

This image is examined for geometric properties by means of image processing, as a result of which the two straight lines 72a and 72b are found. In the example, the assumption is made that the straight line of intersection 72c of the two house walls cannot be established by the image processing due to inexpedient light conditions. The distance data of the target point 71 then emerge as the point of intersection of the planes, which extend through the recording center of the 2D camera and the two straight lines 72a and 72b, and the three planes 70a, 70b and 70c established from the RIM image.

What is claimed is:

1. A mobile field controller for measurement and remote control, configured in such a way that it forms a system for coordinative geodetic determination of the position of target points together with a remote controllable geodetic surveying device having distance and direction measurement functionality, the field controller comprising:
    a control and evaluation unit with an electronic display for controlling the surveying device remotely and for evaluating and/or transmitting measurement data;
    a housing that can be hand-held coupled with the control and evaluation unit;
    a geodetic target object supported by the housing, an absolute target position of which can be determined by the surveying device by means of a direction-based and laser beam-based distance measurement; and
    a distance-measuring unit for determining the distance between the field controller and at least one target point without contacting the ground, wherein the at least one target point is optically marked by means of the field controller,
    wherein:
        a spatial orientation of the field controller can be determined;
        the geodetic target object and the distance-measuring unit are in a defined spatial reference relationship to an internal reference system of the field controller, and
        an absolute position of the target point is calculated from the absolute position of the geodetic target object by means of the determined spatial orientation of the field controller and the determined distance between the field controller and the target point.

2. The field controller according to claim 1, wherein:
    the control and evaluation unit is configured to:
        register measurement data for determining the spatial orientation of the field controller; and
        partly or wholly evaluate the target position of the geodetic target object and the distance between the field controller and the at least one target point.

3. The field controller according to claim 2 wherein:
    the absolute position of the at least one target point is calculated from the measurement data;

the absolute position of the at least one target point is stored and made available to the user by means of an output means of the field controller; and the position data and/or measurement data can be transmitted to external devices.

4. The field controller according to claim 1 wherein:

the distance-measuring unit comprises an electrooptic or an electroacoustic distance measuring unit.

5. The field controller according to claim 1, wherein:

the field controller has an inclination sensor and/or an accelerometer configured to determine:
  at least one alignment angle of the spatial orientation of the field controller; or
  changes of at least one alignment angle about at least one axis of the spatial orientation of the field controller.

6. The field controller according to claim 1, further comprising:

a unit that can be sighted optically by the surveying device and is configured to be used by the surveying device or the field controller to determine an alignment angle about at least one axis of the spatial orientation of the field.

7. The field controller according to claim 1, further comprising:

a unit that determines a direction of incidence of a laser beam emitted by the surveying device.

8. The field controller according to claim 1, wherein:

the geodetic target object is a retro-reflective prism reflector; and the field controller has an attachment of a defined length, by means of which the prism reflector is supported by the housing.

9. The field controller according to claim 1, wherein:

the distance-measuring unit is embodied as a laser rangefinder, with a laser source for emitting optically visible laser light.

10. The field controller according to claim 1, wherein:

the distance-measuring unit has:
  a drive unit, which can be guided in a manual or automated manner, for one-axis or two-axes alignment of the measuring direction; and
  means for determining the measuring direction relative to a zero axis.

11. The field controller according to claim 1, further comprising:

a digital camera that records a digital image of a target point terrain region, which is displayed to the user on the electronic display.

12. The field controller according to claim 11, wherein:

the electronic display is a touch-sensitive display; and at least one target point is selected in a manual or automated manner for determining the position or marking by means of the digital image.

13. The field controller according to claim 1, wherein:

the distance-measuring unit and the control and evaluation unit are configured to register multiple terrain points within a specific contiguous region in the case of a respectively known or synchronously determined measuring direction;

the obtained data are stored as 3D point cloud, wherein the distance-measuring unit is included in at least one of:
  a laser scanner;
  a range image camera;
  a stereo camera; or
  a light-structure 3D scanner.

14. The field controller according to claim 13, wherein:

the 3D data are visualized on the electronic display and at least one point is selected in a manual or automated manner.

15. The field controller according to claim 11, wherein:

algorithms are saved to the control and evaluation unit, wherein the algorithms, when executed:
  perform an analysis of the digital image and/or of a 3D point cloud in respect of specific geometric properties, to automatically find and/or fit geometric forms;
  identify or derive, from the analyzed geometric properties, one or more points serving to identify a target point;
  superimposing the analyzed geometric properties and identified or derived points onto the digital image or onto the visualized 3D point cloud on the electronic display; and
  performing at least one of:
    adopting position data of the identified or derived points directly from the measurement data underlying the 3D point cloud;
    establishing the position data by calculating points of intersection of the fitted geometric forms; and
    performing a target point distance measurement on the basis of the target point identification.

16. The field controller according to claim 1, wherein:

the control and evaluation unit calculates the absolute position of points of a 3D point cloud from the determined spatial orientation of the field controller, from the target position of the geodetic target object and from position data of the 3D point cloud.

17. The field controller according to claim 1, wherein:

the housing has a joint that can be rotated in one or two planes within a specific angular range and to which the target object is fastened, wherein the joint has one or more absolute or incremental position sensors for measuring the at least one alignment angle relative to a zero axis.

18. The field controller according to claim 1, wherein:

the housing and the reflector or the attachment has fasteners in such a way that reflector or attachment are replaceable; and the attachment has an encoding that establishes the length of the attachment, such that the spatial reference relationship of the reflector to the reference point of the field controller is established automatically by the control and evaluation unit.

19. The field controller according to claim 1, wherein:

the control and evaluation unit is configured in such a way that determining the position of at least one target point can be carried out completely from the location of a target point, the control and evaluation unit having a trigger unit, by means of which synchronized measurements of the target position of the geodetic target object, the distance between field controller and target point and the spatial orientation of the field controller can be initialized.

20. The field controller according to claim 1, wherein:

the control and evaluation unit is configured in such a way that measurements of the target position of the geodetic target object, the distance between field controller and target point and the spatial orientation of the field controller in respect of a target point are performed a number of times during a measurement process and the absolute target point position emerges from the mean values of the individual measurements or as mean value of the plurality of absolute target point coordinates.

21. The field controller according to claim 1, wherein:
the field controller and the geodetic surveying device have synchronized GNSS-based, clocks, on the basis of which individual measurement data can be marked in terms of time.

22. A measurement system for geodetic position determination comprising:
a field controller according to claim 1;
a remote controllable geodetic surveying device having distance and direction measurement functionality, including angle measurement functionality, wherein the following can be performed in a synchronized or continuous/periodic manner:
   determination of the spatial orientation of the field controller relative to the absolute external reference system by means of the field controller and/or the surveying device;
   absolute determination of the position of the geodetic target object of the field controller by the surveying device, wherein the surveying device automatically targets the most expediently aligned target object in the case of a field controller having a plurality of target objects; and
   determination of the position of a geodetic target point relative to a field controller-internal reference system by the field controller,
wherein the control and evaluation unit of the field controller calculates the absolute target point coordinates.

* * * * *